UNITED STATES PATENT OFFICE.

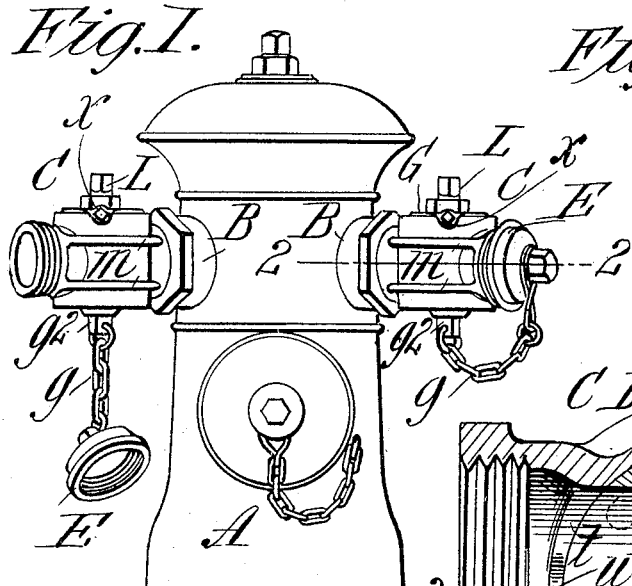
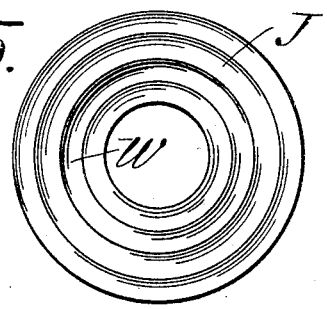
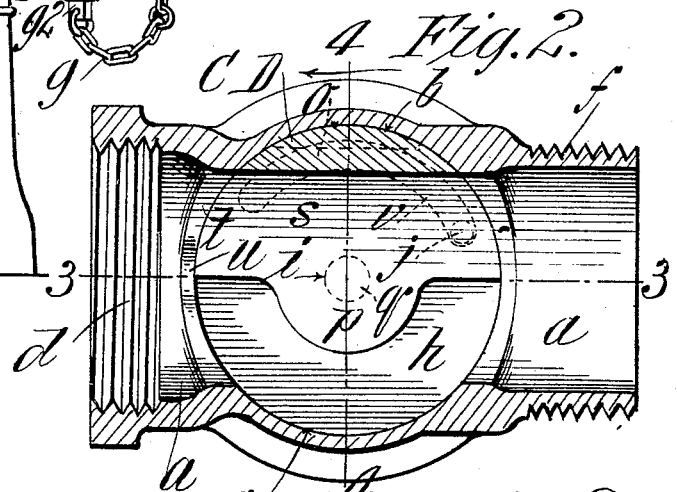
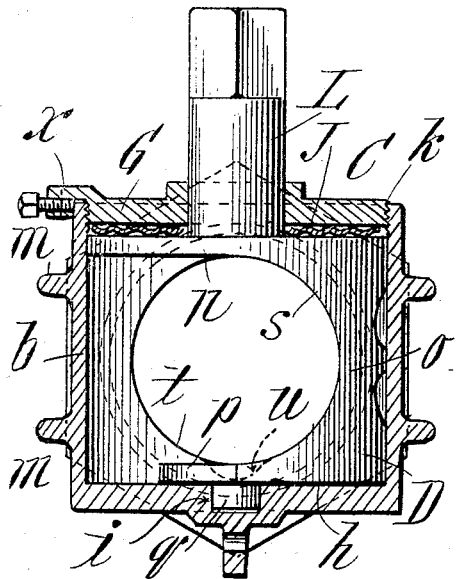
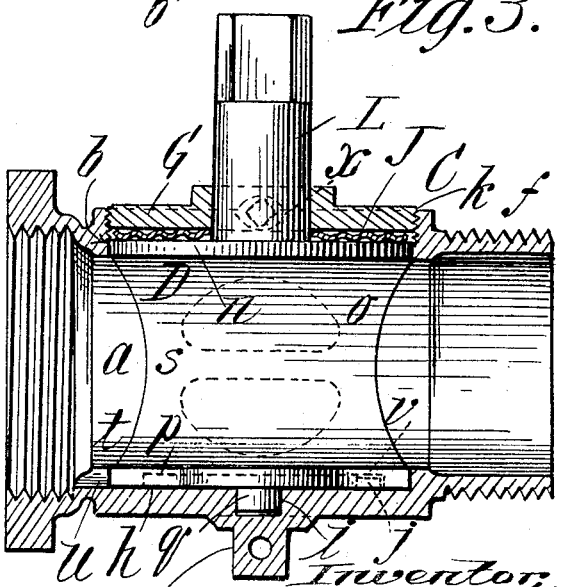

JOHN T. LYNCH, OF HOLYOKE, MASSACHUSETTS, ASSIGNOR TO HOLYOKE VALVE AND HYDRANT COMPANY, OF HOLYOKE, MASSACHUSETTS, A CORPORATION OF MASSACHUSETTS.

INDEPENDENT NOZZLE-VALVE FOR HYDRANTS.

No. 799,394.      Specification of Letters Patent.      Patented Sept. 12, 1905.

Application filed January 20, 1905. Serial No. 241,921.

*To all whom it may concern:*

Be it known that I, JOHN T. LYNCH, a citizen of the United States of America, and a resident of Holyoke, in the county of Hampden and State of Massachusetts, have invented certain new and useful Improvements in Independent Nozzle-Valves for Hydrants, of which the following is a full, clear, and exact description.

This invention relates to appliances of a novel character for connection with the delivery-nozzles of a hydrant and which may be designated as "independent nozzle-valves." By having a hydrant equipped with these new appliances at the exterior thereof it is possible during the time the regular or main valve of a hydrant is open at the water-main communication to have all of the hydrant delivery-nozzles under perfect and independent control, so that, for instance, while one line of hose is connected to one of the independent nozzle-valves and is carrying a stream of water therethrough another line of hose may be connected or disconnected from the other independent nozzle-valve without closing the main hydrant-valve and with the utmost convenience.

It is realized by those familiar with hydrant constructions that owing to the limited space in the head of a hydrant it is impossible to construct inside independent valves for the two or more nozzles which will be strong enough to withstand the rough usage to which they are subjected at the time of a fire.

This invention therefore contemplates the combination, with a hydrant having a plurality of delivery-nozzles, of valved appliances connected with the respective nozzles and each comprising a casing having a waterway therethrough and adapted for hose connection at its outer end and a valve in said casing having an externally-projecting part or stem for opening and closing the waterway; and under this invention the independent nozzle-valve appliance embodies structural features whereby when the valve is closed a recess or opening transversely of the valve (which in the proper positioning of the valve permits the passage of the water from the hydrant-nozzle through the appliance to the hose) has its position toward the passage through the hydrant-nozzle and whereby the water which in small quantities may have remained within the independent nozzle-valve may be drained back into the hydrant for the avoidance of pocketing or trapping water in the nozzle-valve, with liability that the same may freeze and render the device inoperative and valueless in an emergency, and incidental to the construction the nozzle-valve is so constructed in respect of the waterway longitudinally therethrough, the valve seat or chamber intermediate of the length of such waterway, and of the shape or formation of the valve proper as to permit the delivery of a large or maximum solid stream of water through the appliance when the valve is open; and the invention includes certain other specific constructions and formations in the device of the character described, all substantially as hereinafter fully described, and set forth in the claims.

The improved independent valve-nozzle is illustrated in the accompanying drawings, in which, in—

Figure 1, a hydrant is shown in elevation and having connected thereon two of the nozzle-valves. Fig. 2 is a horizontal longitudinal section centrally through one of the nozzle-valves on a larger scale than Fig. 1, the plane of section being indicated by line 2 2 on the first figure. Fig. 3 is a central vertical longitudinal section through the nozzle-valve on the line 3 3, Fig. 2. Fig. 4 is a cross-section as taken through the valve-casing on the vertical plane of section represented by line 4 4, Fig. 2, the valve-body being shown in elevation, and in Figs. 2, 3, and 4 the valve is shown as in its open position. Fig. 5 is a plan view of a packing-washer having circular and concentric corrugations.

Similar characters of reference indicate corresponding parts in all of the views.

In the drawings, A represents the upper portion of an ordinary fire-hydrant having two horizontal and radiating hose-nozzles, connected with each of which, as may be done by screw-coupling connections, are the independent nozzle-valves C C. Each nozzle-valve is as to its form from end to end thereof of an approximately cylindrical shape, with a waterway *a* therethrough, such waterway being intermediately constructed with the cylindrical enlargement $b$ for the reception, with a close fit therein, of the body D of the valve.

The valve-casing has the screw-threads $d$ at its end portion which has connection with the hydrant-nozzle B, and its opposite end is constructed for the coupling therewith of a fire-hose, which coupling in the present instance is to be accomplished by screw engagement with the threads $f$, and each hose-coupling end of the nozzle-valve is to be closed when the hydrant is not being used by the screw-cap E, connected by chain $g$ to the nozzle-valve casing, which has at its bottom a depending eye-provided lug $g^2$, integrally cast. The base of the valve-casing, which constitutes the bottom wall $h$ of the enlarged cylindrical chamber, is internally perfectly flat and level and is centrally formed with a socket $i$ and the upstanding short stud $j$ at a point eccentrically of such socket, and the valve-receiving chamber $b$ is upwardly opened, as shown at $k$, the surrounding wall of such opening being internally screw-threaded. The valve-casing is externally and longitudinally ribbed, as shown at $m$, for strengthening the otherwise comparatively light casing structure.

The body D is made in the form of a modified cylinder—that is, a comparatively thin upper portion $n$ thereof is a full and true cylindrical form, while the back $o$ of the valve-body from top to bottom thereof has the form of a segment of a cylinder, while the base portion $p$ is more or less extended transversely from the back portion $o$ and has its bottom perfectly flat and smooth to fit the correspondingly-shaped inner surface of the casing-wall and has the downwardly-projecting central stud $q$, which fits in the socket $i$, and consistent with the formation of the valve-body as aforesaid such body has the sidewise-opened semicylindrical recess $s$, such opening when the valve is closed having its location to the leftward or toward the hydrant-connecting end of the nozzle-valve casing, and so that any water remaining within the nozzle-valve after the same shall have been closed will flow back into the hydrant, and inasmuch as the casing has an internal annular wall $t$ upstanding from the base and adjacent the junction of the longitudinal waterway $a$ with the valve-chamber $b$, which might obstruct the drainage of the water from the nozzle-valve back into the hydrant, a drainage-channel $u$ is made, as shown in Figs. 2, 3, and 4, through the upstanding wall $t$, thereby insuring the desired absolutely complete drainage.

The valve-body has within its bottom the arc-shaped slots $v$ concentric with the axial stud $q$, upwardly into which engages the aforementioned short stud $j$ of the casing-base, this interengaging stud and groove constituting means for limiting the movements of the valve-body, which is movable to assume the position (open) shown in the drawings or a closed position at right angles thereto.

A flat screw-cap G, peripherally-threaded screw engages into the threaded upper opening $k$, communicating with the valve-chamber, and between the flat under side of the screw-cap and the flat top of the valve-body a washer J is interposed under compression, such washer having a series of circularly-extending and concentric corrugations $w$, so as to give a plurality of circular lines of close bearing against the top of the valve to prevent the leakage of water in pressure through the nozzle-valve outwardly at the top. The top cap G being annular permits the valve-stem L to pass upwardly therethrough and therebeyond to be accessible for opening and closing the valve. The top cap G has an angular lug $x$ extending across the top edge of the wall of the casing surrounding the cap-receiving opening $k$ and also extending downwardly adjacent the outer side of such wall, a set-screw passing through and carried by said lug constituting simply and efficiently a locking means for holding the cap in its properly set-up position against the packing-washer.

The independent nozzle-valve having the formations and features of construction hereinabove described with particularity and illustrated in the drawings has the practical advantages sought to be attained by this invention as set forth in the statement of the nature and object thereof.

Having thus described my invention, what I claim, and desire to secure by Letters Patent, is—

An independent hydrant-valve nozzle consisting of a casing, having a waterway from end to end therethrough formed with a central cylindrical, upwardly-opening enlargement, and constructed at one of its ends for screw connection with the hydrant-nozzle, and at its other end to receive connection therewith of a hose, and having a drainage-channel leading from the junction of said enlargement with the hydrant end of said waterway, at the bottom portion, a valve comprising a cylindrical portion fitting in said enlargement and formed with a sidewise-opening recess, and having an upwardly-projecting operating-stem, a cap-screw threading in the upper opening of the casing, and through the central opening of which the valve-stem projects, and means for limiting the rotational movements of the valve-body so that when closed its recessed side is toward said drainage-channel at the hydrant-connecting end of the appliance.

Signed by me at Holyoke, Massachusetts, in presence of two subscribing witnesses.

JOHN T. LYNCH.

Witnesses:
JOHN HILDRETH,
ANNIE AINSWORTH.